US012090674B2

(12) United States Patent
Petrelli

(10) Patent No.: US 12,090,674 B2
(45) Date of Patent: Sep. 17, 2024

(54) SHAVING APPARATUS WITH DRIVE FOR SETTING AN OPERATIONAL PARAMETER

(71) Applicant: KONINKLIJKE PHILIPS N.V., Eindhoven (NL)

(72) Inventor: Marcus Cornelis Petrelli, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 306 days.

(21) Appl. No.: 17/608,180

(22) PCT Filed: May 13, 2020

(86) PCT No.: PCT/EP2020/063256
§ 371 (c)(1),
(2) Date: Nov. 2, 2021

(87) PCT Pub. No.: WO2020/229503
PCT Pub. Date: Nov. 19, 2020

(65) Prior Publication Data

US 2022/0212358 A1 Jul. 7, 2022

(30) Foreign Application Priority Data

May 14, 2019 (EP) .................................... 19174362

(51) Int. Cl.
*B26B 19/14* (2006.01)
*B26B 19/28* (2006.01)
*B26B 19/38* (2006.01)

(52) U.S. Cl.
CPC ............ *B26B 19/143* (2013.01); *B26B 19/28* (2013.01); *B26B 19/3846* (2013.01); *B26B 19/3853* (2013.01)

(58) Field of Classification Search
None
See application file for complete search history.

(56) References Cited

U.S. PATENT DOCUMENTS 3,213,536 A 10/1965 Bodo
3,233,323 A 2/1966 Josef
(Continued)

FOREIGN PATENT DOCUMENTS

EP 0329244 A1 8/1989
EP 0484795 A1 5/1992
(Continued)

OTHER PUBLICATIONS

International Search Report and Written Opinion Dated Oct. 1, 2020 for International Application No. PCT/EP2020/063256 Filed May 13, 2020.

*Primary Examiner* — Hwei-Siu C Payer

(57) ABSTRACT

A shaving unit for a shaving apparatus including a cutting unit, a main input spindle coupled to each cutting unit to drive an internal cutting member, and a system for adjusting operational parameters of the shaving unit. The adjustment system includes an adjustment input drive member drivable by the spindle, a unidirectional coupling member for coupling the spindle and the adjustment input drive member, when rotating in a first direction, such that the adjustment input drive member is driven by the spindle. A decoupled condition of the spindle and the adjustment input drive member is also provided when the spindle rotates in a second direction, such that the spindle is prevented from driving the member.

20 Claims, 11 Drawing Sheets

(56) References Cited

U.S. PATENT DOCUMENTS

| | | | | | |
|---|---|---|---|---|---|
| 3,992,775 | A | * | 11/1976 | De Vries | B26B 19/145 30/34.2 |
| 4,137,629 | A | * | 2/1979 | Yamazaki | B26B 19/14 30/43.5 |
| 5,687,481 | A | | 11/1997 | De Boer | |
| 2006/0288581 | A1 | | 12/2006 | Rogatschnig | |
| 2007/0084059 | A1 | | 4/2007 | Hannan | |
| 2018/0161996 | A1 | | 6/2018 | Julemont | |
| 2022/0212358 | A1 | * | 7/2022 | Petrelli | B26B 19/3853 |

FOREIGN PATENT DOCUMENTS

| | | | | |
|---|---|---|---|---|
| EP | 3 647 001 | A1 | * | 5/2020 |
| EP | 4 094 907 | A1 | * | 11/2022 |
| EP | 3 249 193 | A1 | * | 9/2023 |
| GB | 2061168 | A | | 5/1981 |
| WO | WO 95/32843 | | * | 12/1995 |
| WO | 2004/056539 | A1 | | 7/2004 |
| WO | 2020094432 | A1 | | 5/2020 |

* cited by examiner

Fig. 6
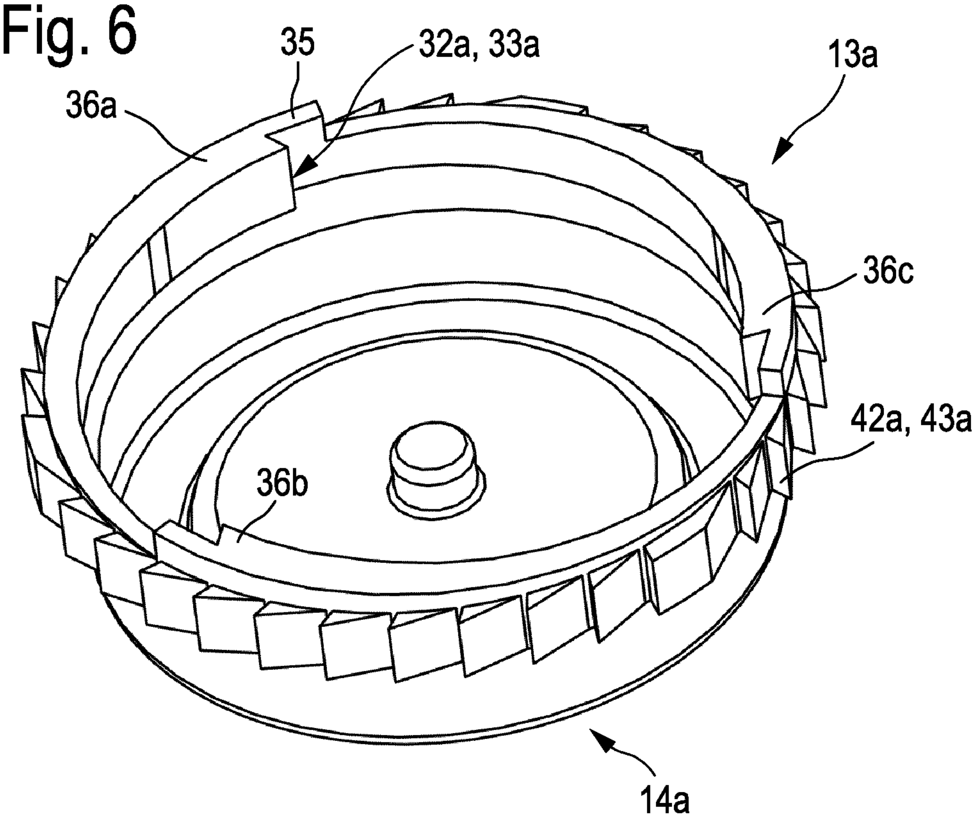
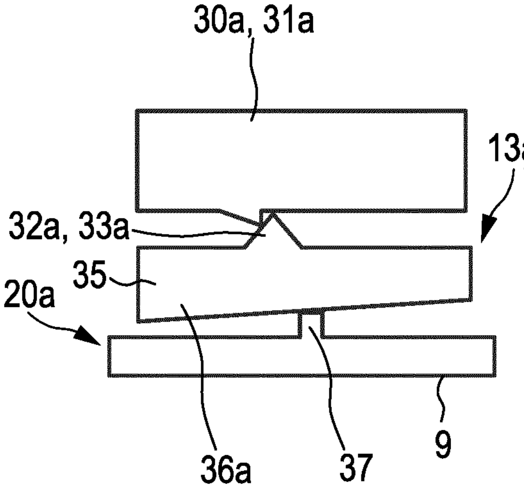
Fig. 7A
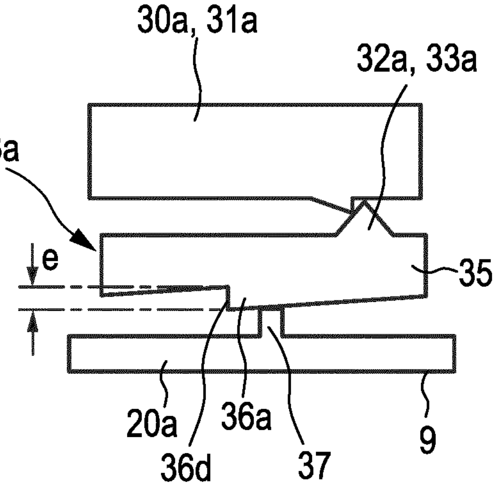
Fig. 7B

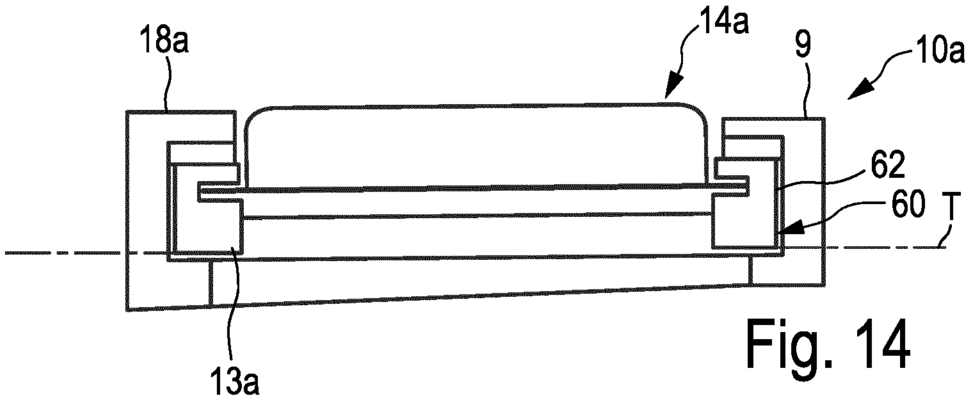
Fig. 14
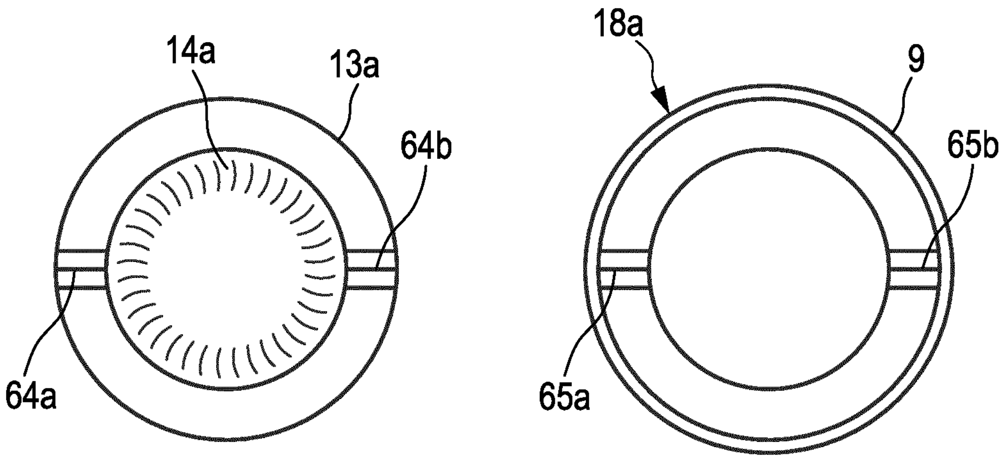
Fig. 15A
Fig. 15B
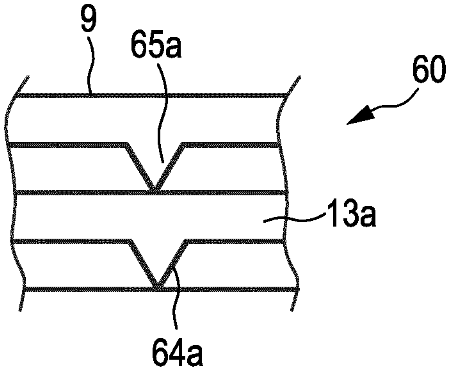
Fig. 15C

SHAVING APPARATUS WITH DRIVE FOR SETTING AN OPERATIONAL PARAMETER

CROSS REFERENCE TO RELATED APPLICATIONS

This application is the U.S. National Phase application under 35 U.S.C. § 371 of International Application No. PCT/EP2020/063256 filed May 13, 2020, which claims the benefit of European Patent Application Number 19174362.4 filed May 14, 2019. These applications are hereby incorporated by reference herein.

FIELD OF THE INVENTION

The invention relates to a shaving unit for a shaving apparatus, the shaving unit comprising: a housing; at least one cutting unit accommodated and supported by the housing and comprising an external cutting member having a plurality of hair-entry openings and an internal cutting member which is rotatable relative to the external cutting member about a cutting member axis; a main input spindle which is rotatable about a main axis and which is coupled to each cutting unit to rotationally drive the internal cutting member thereof; and an adjustment system configured to adjust at least one operational parameter of the shaving unit.

BACKGROUND OF THE INVENTION

A shaving unit of this type is employed in electrical shavers including one, two, three or more cutting units. Generally, in such a shaving unit, the cutting function of the hair to be cut is provided by a shear force applied to the hair by the hair entering through one of the hair entry openings in the external cutting member and then being sheared by the cutting element of the internal cutting member, which is rotated with respect to said hair entry opening. Whilst the internal cutting member is driven into a rotational movement about the axis of rotation, the external cutting member and the housing are kept stationary with respect to said axis of rotation such that a relative movement between the internal cutting member and the external cutting member is provided.

The external cutting member, which could be entitled as a cap or could comprise a cap being in contact with the skin of the user in operation, is therefore to be held in a stationary condition during operation with respect to said rotation. Since in operation, a pressure applied to the external cutting member may produce a contact between the external cutting member and the rotating internal cutting member, or even cause a cutting member of the internal cutting member to form-lock with a hair entry opening of the external cutting member, thus causing a significant torque about the axis of rotation onto the external cutting member, it is known to provide a safe, torque-resistant mounting of said external cutting member in the shaving unit.

The cap usually is surrounded by a portion of the housing which also could be called floe and which during use of the shaving apparatus touches the skin and supports the skin. The cap usually protrudes in an axial direction along an axis of rotation of the internal cutting member with respect to the floe, and this distance is called cap exposure. Thus, the cap exposure is the difference between the top surface of the cap and the top surface of the floe. In principle, it is true that the higher the exposure is, the better the shaving performance on speed and closeness is. The lower the exposure, the better the shaving performance is on comfort. Cap exposure is one of the main parameters on cutting and comfort performance of a shaving system. Usually, the exposure is fixed in common shavers and set by the manufacturer.

However, from U.S. Pat. No. 5,687,481 a shaving apparatus is known which allows adjustment of the exposure using a separate electronic control. To achieve this, the cutting unit is arranged in a holder and is displaceable relative to the holder by means of the electronic actuator. However, a drawback of this design is that it is rather complex and requires additional parts. A device which allows shifting between at least two height positions of both, a long-hair cutting device and a short-hair cutting device, is disclosed in U.S. 2006/0288581 A1. A further similar device is disclosed in EP 0 484 795 A1.

Furthermore, a beard trimmer with adjustable combs for defining a distance between a cutting member and the skin is disclosed in U.S. 2018/161996 A1. The adjustment can be motorized or manual. A still further device which allows manual adjustment of the exposure is disclosed in U.S. Pat. No. 3,233,323.

Beside the drawback that all these devices are rather complicated to use and have specific drawbacks regarding complexity of the product, a still further need exists in also adjusting other operational parameters additional to exposure in a simple and convenient way. In particular, it is desired to use the general structure of the shaving apparatus and provide a system which allows similar techniques for adjusting different operational parameters so that the same adjustment technique can be used by the manufacturer to implement shaving apparatus with a specific and simple adjustment of one or more operational parameters.

SUMMARY OF THE INVENTION

According to the invention, a shaving unit including an adjustment system is provided. The adjustment system includes an adjustment input drive member which is arranged to be rotational about an adjustment member axis and drivable by the main input spindle. The adjustment system further includes a unidirectional rotational coupling member arranged to provide a coupled condition of the main input spindle relative to the adjustment input drive member, when the main input spindle rotates in a first direction about the main axis, such that the adjustment input drive member is driven by the main input spindle, and to provide a decoupled condition of the main input spindle relative to the adjustment input drive member, when the main input spindle rotates in a second direction about the main axis opposite to the first direction, such that the main input spindle is prevented from driving the adjustment input drive member.

The invention is based on the idea that the main input spindle, which is used for driving the internal cutting member, can be rotated in a reverse direction for changing or adjusting at least one operational parameter of the shaving unit. Thus, when the main input spindle rotates in the second direction, which is the main direction, the internal cutting members are driven for carrying out the cutting operation. When the main input spindle is driven in the first direction, which is the reverse direction, the adjustment input drive member is driven, which in turn causes adjustment of the at least one operational parameter of the shaving unit. The unidirectional rotational coupling member is then used to couple the main input spindle with the adjustment input drive member only in the reverse direction, which is the first direction. In the second direction, which is the main direction, the unidirectional rotational coupling member allows rotation of the main input spindle relative to the adjustment input drive member.

Due to this arrangement, a simple mechanism is provided which allows using the main input spindle and the regular drive of the shaving apparatus to adjust at least one operational parameter of the shaving unit. There is no additional transmission needed from a handle of the shaving apparatus and the cutting unit, which is usually arranged to be decoupled by use, e.g. for maintenance or cleaning. Simply by rotating the main input spindle in the reverse direction, coupling of the main input spindle with the adjustment input drive member is facilitated which allows rotating the adjustment input drive member for adjusting the at least one operational parameter.

Preferably, the adjustment input drive member is only rotated but not moved in any translational direction. However, the adjustment input drive member can be used to facilitate translational or at least partial translational movement of a further element for adjusting the at least one operational parameter of the shaving unit.

In different embodiments, which will be described below in more detail, the operational parameter for example could be the exposure setting, a stiffness of a floating cap, tilting of cap and pretention.

It should be understood that even though the invention is described with respect to only at least one cutting unit, common shaving apparatus usually comprise two or three cutting units in the shaving unit. When there are two or more cutting units and the operational parameter to be adjusted refers to one of those cutting units, it is preferred that the operational parameter of each of the cutting units is adjusted by rotating the main input spindle into the first direction.

Generally, according to the invention, the housing may comprise an annular housing portion surrounding the external cutting member and a base portion arranged underneath the external cutting member. These or other parts of the housing of the shaving unit may provide the locking system function between said housing and said external cutting member.

These and other aspects of the invention will be apparent from and elucidated with reference to the embodiments described hereinafter. It shall be understood that a preferred embodiment of the present invention can also be any combination of the dependent claims or above embodiments with the respective independent claim.

According to a first preferred embodiment, the adjustment member axis coincides with the cutting member axis, wherein the unidirectional rotational coupling member comprises a first portion rotationally coupled to the internal cutting member and a second portion rotationally coupled to the adjustment input drive member. According to this embodiment, the adjustment input drive member may be attached or integrally formed with the second portion of the unidirectional rotational coupling member. Also, the first portion of the unidirectional rotational coupling member may be attached to or integrally formed with the internal cutting member. The adjustment input drive member in turn may be coupled or attached to one further element of any further structure which is to be adjusted for adjusting the operational parameter. Due to this arrangement, a compact design is achievable since the single parts are arranged rotatable about the same axis, namely the cutting member axis of the internal cutting member. Furthermore, it is preferred that the second portion of the unidirectional rotational coupling member is rotationally coupled to the external cutting member. In this embodiment, preferably both, the adjustment input drive member and the second portion of the unidirectional rotational coupling member are attached to the external cutting member. This allows a compact structure and the external cutting member is able to provide support for both, the adjustment input drive member and the second portion of the unidirectional rotational coupling member. For adjusting the operational parameter, in this embodiment, the external cutting member needs to be rotated. Accordingly, it is rotated in the reverse direction which is identical with the first direction. In the second direction, which is the main direction, the external cutting member should be fixed, so that the external cutting member is not rotated into the main direction during a cutting operation. Such rotation could lead to injuries and is thus to be prevented.

In a further preferred embodiment, said unidirectional rotational coupling member comprises a first clutch member attached to the internal cutting member and a second clutch member attached to the adjustment input drive member for cooperation with the first clutch member. In a particularly preferred embodiment, said first clutch member is a flexible tongue and said second clutch member is a notch. It should be understood that it could also be vice versa, in a sense that the second clutch member is a flexible tongue and the first clutch member is a notch. This arrangement results in a one-way clutch which forms the unidirectional rotational coupling member and which only allows rotation of the internal cutting member with respect to the external cutting member in one rotation, namely into the main direction. In the reverse direction, the flexible tongue engages the respective notches and thus is, able to rotate the adjustment input drive member about the adjustment member axis.

According to a further preferred embodiment, said unidirectional rotational coupling member is configured and arranged to rotationally couple said main input spindle and said adjustment input drive member at a predetermined number C1 of angular positions uniformly distributed about the cutting member axis for rotating said adjustment input drive member into said first direction, with $1 \leq C1 \leq 10$, preferably C1=3. In an embodiment, in which the second clutch member is a notch, C1 refers to the number of notches. Thus, C1 is the number of engagement positions rotationwise between the first and the second portions of the unidirectional rotational coupling member. When there is a number of 3, which is preferred, such arrangement results in an increased stability.

For further increasing stability and safety, it might be provided that the external cutting member is coupled to the housing by means of a further unidirectional rotational coupling member arranged to prevent, during use, rotation of the adjustment input drive member relative to the housing in said second direction of the internal cutting member about the cutting member axis, said further unidirectional rotational coupling member comprising a first locking member attached to the adjustment input drive member and a second locking member attached to the housing for cooperation with the first locking member. During use, it is preferred that the adjustment input drive member is secured against rotation into the second direction which is the main direction. In particular, this embodiment is beneficial when the adjustment input drive member is attached to the external cutting member. In the other direction, which is the reverse direction, rotation of the external cutting member with respect to the housing is allowed. This might or might not be necessary for adjusting the at least one operational parameter, but in fact could be used for adjusting the operational parameter in a beneficial way. In general, the unidirectional rotational coupling member and the further unidirectional rotational coupling member may be formed substantially identical to each other, i.e. using tongues and notches. Preferably, the further unidirectional rotational coupling member is adapted to cause engagement between the external cutting member and the housing while said internal cutting member is allowed to rotate within said external cutting member when said main input spindle is rotated in the second direction. Further, the unidirectional rotational coupling member is adapted to cause engagement between the internal cutting member and the external cutting member, while said external cutting member is allowed to rotate relative to said housing when said main input spindle is rotated in the first direction.

Such an embodiment may further be improved by the first locking member comprising an annular array of N1 first arresting elements which are concentrically arranged relative to the cutting member axis with a uniform distribution about the cutting member axis, and in that the second locking member comprises N2 second arresting elements, wherein:

$$N1 \geq 8 \text{ and } 1 \leq N2 \leq N1;$$

the N2 second arresting elements are configured and arranged to be each engageable with a respective one of the N1 first arresting elements in any of N1 angular positions of the adjustment input drive member about the axis of rotation relative to the housing; and each of the N2 second arresting elements is configured and arranged to prevent rotation of the adjustment input drive member relative to the housing in said second direction by engagement with said respective one of the N1 first arresting elements in any of said N1 angular positions of the adjustment input drive member.

According to this embodiment, at least eight different angular positions are provided by the locking system wherein rotational movement of the adjustment input drive member is prevented. It is preferred that more than 8, e.g. more than 9, 10, 12, 16, 18, 36 or even more than these numbers of possible angular positions are provided by the locking system. By this, the adjustment input drive member can be locked in a significant large number of alternative angular positions and thus, on the one hand assembling of the adjustment input drive member is significantly facilitated and the risk of misalignment and non-form-locking of the adjustment input drive member is significantly reduced. On the other hand, multiple different increments of adjustment are provided which may increase usability and comfort for the user.

Even further it is preferred that a number N3 of selectable settings of said at least one operational parameter of the shaving unit equals N1/C1. Thus, when C1=3, N1 should be a number dividable by 3, as e.g. 9, 12 or the like. Due to such an arrangement it is allowed to have an evenly distributed position of selectable settings as e.g. four or five settings, which are, when C1 equals 3, are selectable in a range of 120° rotation of the adjustment input drive member.

According to a further preferred embodiment, the shaving unit comprises for each cutting unit a cutting unit input spindle connected to and driven by said main input spindle, wherein said cutting unit input spindle preferably is configured and arranged to be engaged with said internal cutting member in C1 rotational positions of said cutting unit input spindle relative to said internal cutting member. When a user e.g. for the purpose of cleaning dissembles or opens the shaving unit, he/she might also remove the internal cutting member and replace it after cleaning or replace the internal cutting member with a new one. When said cutting unit input spindle is configured and arranged to be engageable with said internal cutting member in C1 rotational positions, the setting of the adjustable operational parameter can be maintained, as the unidirectional rotational coupling member also is configured and arranged to rotationally couple said main input spindle and said adjustment input drive member at the predetermined number C1 of angular positions. Since these numbers are selected to be identical, the user may simply place the internal cutting member at any position and can still maintain the already selected and adjusted operational parameter.

It is still further preferred that the shaving unit comprises a spindle gear box, wherein a gear ratio of said spindle gear box is 1 or 1/C1. Such an arrangement may be beneficial when it comes to synchronizing two or more cutting units of the shaving unit. As usual, the cutting unit may comprise a respective skin supporting surface surrounding the external cutting member and the external cutting member protrudes relative to the skin supporting surface in an axial direction parallel to the cutting member axis over an exposure distance. Each external cutting member is surrounded by at least a portion of this surface.

According to a particularly preferred embodiment of the invention, a minimum value of the exposure distance is dependent on an angular position of the adjustment input drive member about the cutting member axis relative to the housing and the main input spindle is rotatable in said first direction for changing said minimum value of said exposure distance. Thus, in this particularly preferred embodiment, the exposure distance is the operational parameter which is adjustable using the adjustment system. It may be provided that upon rotation of the adjustment input drive member the respective exposure distance increases and is set as the minimum value. The minimum value of the exposure distance refers to the exposure distance when the external cutting member is pressed against a respective biasing force into the housing. Usually, the external cutting member is spring biased into an extended position but can be pushed downwards along the cutting member axis until it engages a stop or a similar member. This minimum value of the exposure distance may be adjusted between a minimum settable distance and a maximum settable distance.

Furthermore, in an alternative, it is preferred that each cutting unit comprises a blade spring for biasing said external cutting member into an extended position. According to this particular embodiment, it is preferred that a stiffness of the blade spring is dependent on an angular position of said adjustment input drive member. Thus, by rotating the adjustment input drive member, a stiffness of the blade spring is adjustable. Preferably, the stiffness of the blade spring is adjustable between a minimum and a maximum value. The minimum and maximum values between which the stiffness of the blade spring is adjustable may be chosen and set by the manufacturer, or by the user. Thus, by rotating the main input spindle in the first direction, which is the reverse direction, the stiffness of the blade spring can be adjusted. This allows an increased comfort for the user since he is able to adjust the stiffness of the blade spring and thus the force which is required to push down the external cutting members according to his or her preferences. This also may lead to an improved shaving result, as less skin irritations may be generated.

Furthermore, in a preferred embodiment, the cutting unit in addition to the skin supporting surface also comprises a tilting hinge, allowing tilting of at least said external cutting member relative to said skin supporting surface about a tilting axis. In this embodiment, it is preferred that in a first rotational position of said adjustment input drive member, tilting is allowed and in a second rotational position of said adjustment input drive member, tilting is prevented. This embodiment in particular is also beneficial in combination with one of the above embodiments regarding adjustment of the exposure distance and/or adjustment of the stiffness of the blade spring. For activating or deactivating the tilting hinge, only two specific positions are needed, thus leaving space for other rotational positions of the adjustment input drive member for adjusting any other operational parameter.

In a still further preferred embodiment of the invention, each cutting unit comprises a supporting member supporting the external cutting member, said supporting member being pivotable relative to the housing of the shaving unit, and wherein each cutting unit further comprises a pretension suspension assembly for biasing the supporting member relative to the housing into a pivotal rest position, said pretension suspension assembly comprising a spring element, and a tensioning mechanism for tensioning said spring element coupled with said adjustment input drive member. In this embodiment, it is preferred that rotation of said adjustment input drive member causes said tensioning mechanism to adjust tension of said spring element and, thereby, to adjust a biasing force exerted by said spring element on the supporting member in said pivotal rest position of the supporting member. In addition to the external cutting member being spring biased, also the supporting member which usually comprises the hair chamber is suspended to increase comfort of the shaving apparatus. The tensioning mechanism allows a tensioning of said spring element and the tensioning mechanism in this embodiment is coupled with the adjustment input drive member so that rotation of the adjustment input drive member changes tension of said spring element. The tension of the spring element might be adjusted by compressing a spring or by similar means. Also, these features may result in an increased shaving comfort and also in an improved shaving result, as skin irritations may be reduced.

A further aspect of the invention is a shaving apparatus comprising a main body accommodating a drive system and a shaving unit as described beforehand which is driven by said drive system. The drive system includes a drive sensor for measuring a rotational position of an output shaft of said drive system. Since the setting of the operational parameter is dependent on the rotational position of the output shaft, which is coupled with the main input spindle in the assembled state, this aspect of the invention allows determining the current operational parameter based on a value obtained by the sensor. Moreover, the shaving apparatus provides the functional benefits of the shaving unit as described beforehand. The shaving unit may be permanently coupled to the main body or may be releasably coupled to the main body.

In an even further aspect of the invention, the above-mentioned problem is solved by a method for synchronizing two or more cutting units of a shaving unit as described beforehand. The method comprises at least the step: rotating said main input spindle in said first direction for a predetermined angular value. In particular, said main input spindle is rotated until said unidirectional rotational coupling members of each of the two or more cutting units are engaged and in a coupled state. This is a very simply way of synchronizing the two or more cutting units. For example, it can be provided that the step of rotating said main input spindle in said first direction for a predetermined angular value is carried out after each start of the shaving apparatus. Every time when a user switches the shaving apparatus on, the main input spindle is rotated for the predetermined angular value in the first direction, which is the reverse direction, for synchronizing the at least two or more cutting units.

In an embodiment, in which the unidirectional rotational coupling member comprises a first clutch member attached to the internal cutting member and a second clutch member attached to the adjustment input drive member, the method preferably comprises the steps of rotating said main input spindle in said first direction at least until said unidirectional rotational coupling member causes engagement between said internal cutting member and said adjustment input drive member. When said internal cutting member and said adjustment input drive member are engaged, these elements are synchronized with each other. Thus, dependent on the rotational positions of form-locking elements or engagement elements, the predetermined angular value for which said main input spindle needs to be rotated is determined.

For the particularly preferred embodiment, in which said unidirectional rotational coupling member is configured and arranged to rotationally coupled said main input spindle and said adjustment input drive member at a predetermined number C1 of angular positions uniformly distributed about the cutting member axis, the method according to the third aspect of the invention preferably comprises the step of rotating said main input spindle in said first direction at least for a rotational angle of 360°/C1 degree. When all cutting units are synchronized, the main input spindle may be rotated in the second direction, which is the main direction, for starting the shaving operation. Also, the step of rotating the main input spindle in said first direction for a predetermined angular value is carried out after a user has adjusted at least one of the operational parameters. Moreover, the step also is preferably carried out after a user having cleaned or opened or otherwise dissembled and reassembled the shaving unit.

These and other aspects of the invention will be apparent from and elucidated with reference to the embodiments described hereinafter.

BRIEF DESCRIPTION OF THE DRAWINGS

In the following drawings:

FIG. 6 shows a perspective view of an adjustment input drive member coupled to an external cutting member, FIGS. 7A-7B show schematic views of the adjustment system, FIG. 14 shows a cut view of a cutting unit in a further embodiment, FIG. 15A shows an adjustment input drive member of FIG. 14, FIG. 15B shows a portion of the housing of FIG. 14, FIG. 15C shows a schematic view of the function of the adjustment input drive member of FIG. 14.

DETAILED DESCRIPTION OF THE EMBODIMENTS

Figure 1:
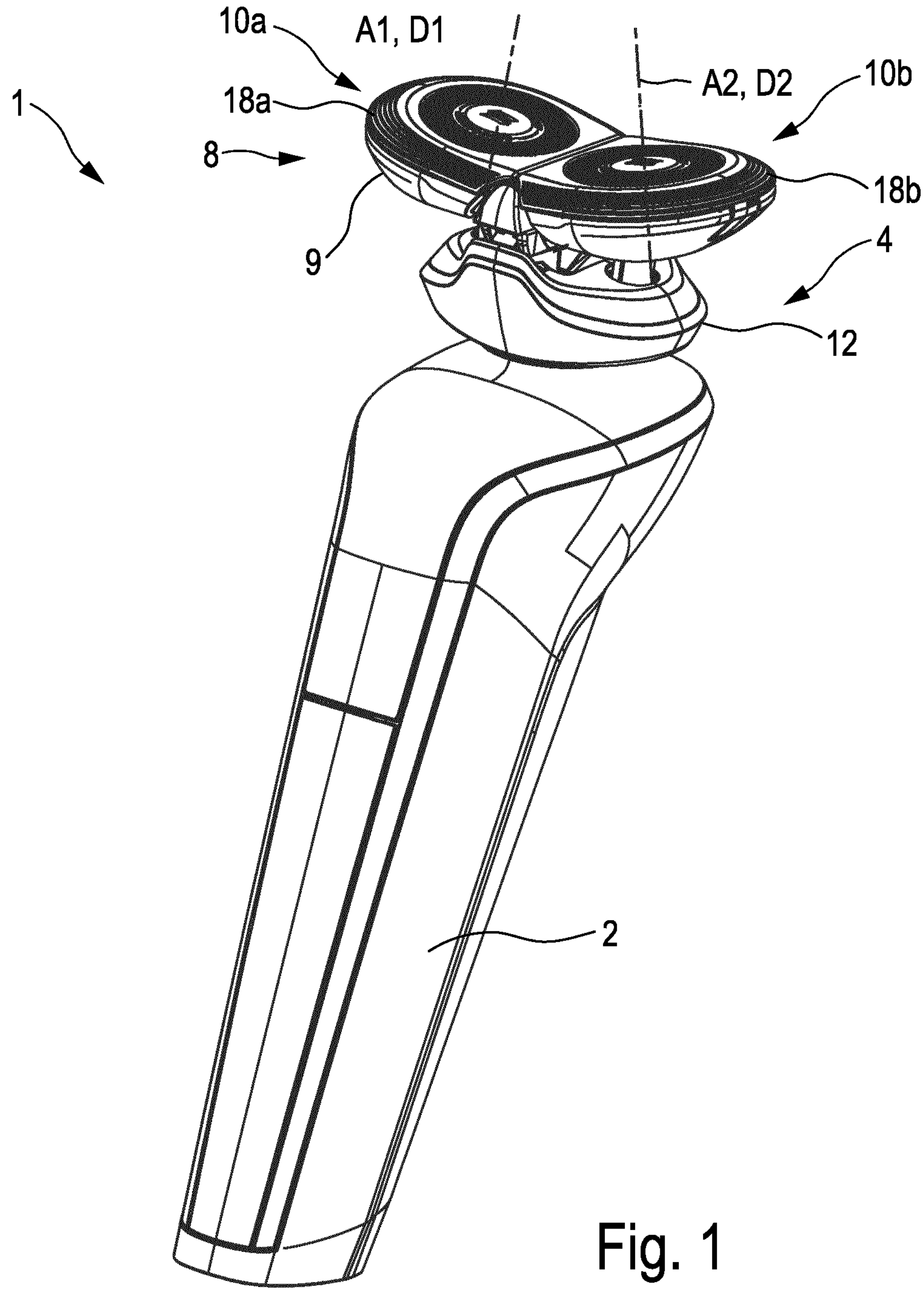
FIG. 1 shows a perspective view of a shaving apparatus according to the invention.

FIG. 1 shows a rotary shaving apparatus 1 according to the invention, comprising a housing or main body 2 and a shaving-head holder or head portion 4. The head portion 4 comprises a shaving unit 8 which is detachable from the main body 2 carries at least one, in this embodiment two, cutting units 10*a*, 10*b*. The cutting units 10*a*, 10*b* are drivable by a drive system 6 (see FIG. 9) which is accommodated in the main body 2. The drive system 6 is coupled to the first and second cutting units 10*a*, 10*b* by a gear box 12, also included in the head portion 4. The cutting units 10*a*, 10*b* are enclosed by a housing 9, and each comprise an external cutting member 14*a*, 14*b* (see FIG. 2) with hair trap openings 15*a*, 15*b* and an internal cutting member 16*a*, 16*b* with cutter elements 17*a*, 17*b* which can be driven into rotation with respect to the external cutting member 14*a*, 14*b* about two axes of rotation A1, A2 with one axis of rotation A1, A2 associated with each cutting unit 10*a*, 10*b*. The cutting units 10*a*, 10*b* may be pivotable about a single axis or multiple axis to be able to follow the contour of the skin of the user such as to provide comfortable shaving. Thus, the axes of rotation may change their orientation with respect to the main body 2 upon tilting of the cutting units 10*a*, 10*b*. This change of orientation may be synchronized between the cutting units 10*a*, 10*b* or may be independent for each of the cutting units 10*a*, 10*b*. The internal cutting member 16*a*, 16*b* is driven by a drive like an electric motor of the drive system 6 accommodated in the main body 2, which may further comprise various components like e.g. a rechargeable battery, a control unit and an interface for controlling and charging the shaving apparatus 1. It should be understood that one, two (as depicted), three, four or more of such cutting units 10*a*, 10*b* could be provided at the head portion 4 without departing from the invention.

Figure 2:
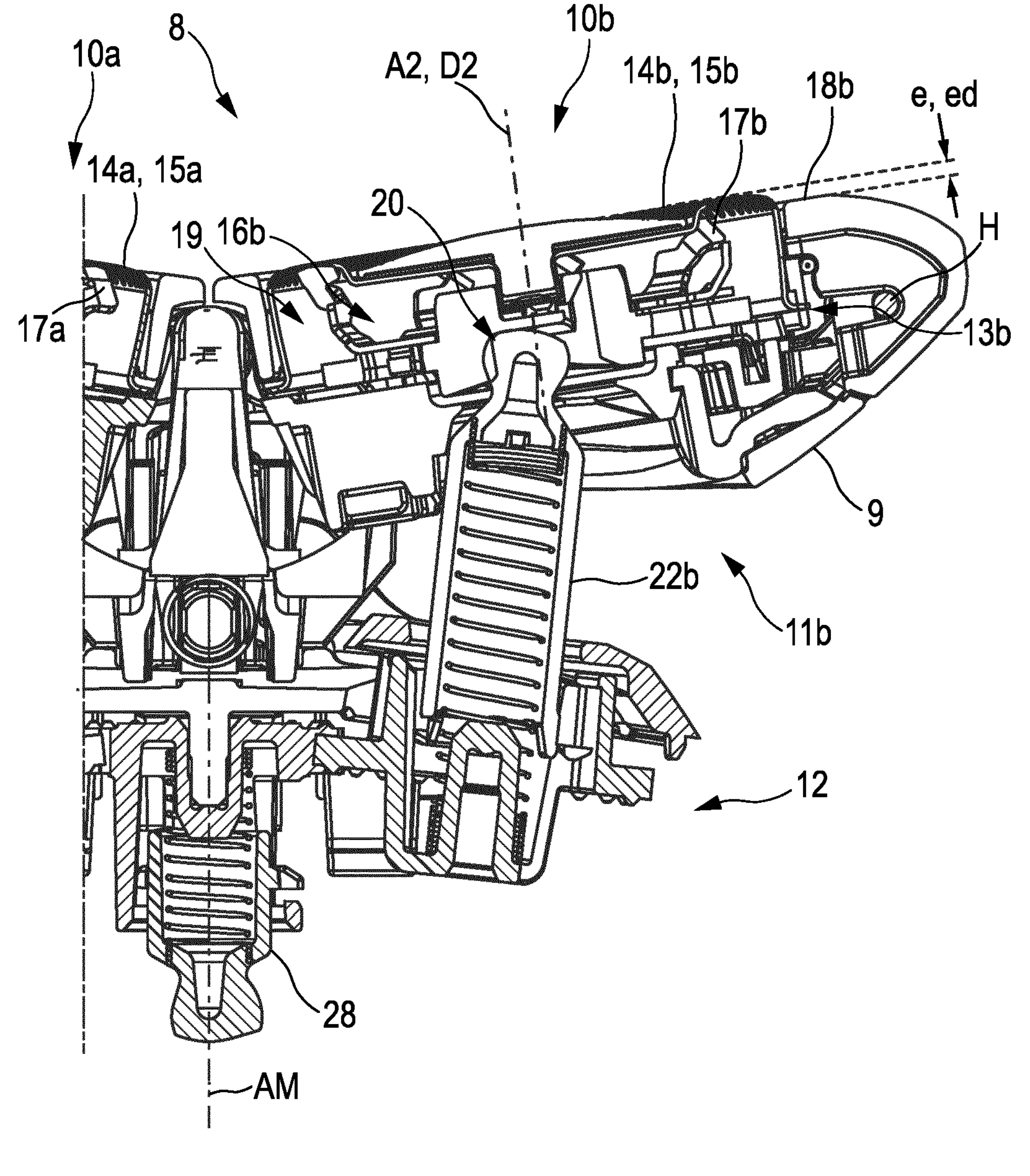
FIG. 2 shows a full cut through a partial shaving unit.

Making reference to FIG. 2, the shaving unit 8 is shown in a cut view, while a major part of the left, first cutting unit 10*a* is omitted for clarity reasons. The cutting unit 10*b* is shown in full cut view and in particular the assembly of the external cutting member 14*b* and the internal cutting member 16*b* can be seen in detail. In the following, when only one cutting unit 10*a*, 10*b* or parts thereof is described, it should be understood that the same usually is true for the further cutting unit(s) 10*a*, 10*b*. The external cutting member 14*a*, 14*b* is formed as a circular cap with an upper skin contacting surface, in which the hair trap openings 15*a*, 15*b* are provided. The external cutting member 14*a*, 14*b* is mounted in an upper portion of the housing 9 and surrounded by a skin supporting surface 18*a*, 18*b*, which is part of the housing 9. Within or below the external cutting member 14*a*, 14*b* a hair chamber 19 is formed, in which the cut-off hairs are collected. For emptying the hair chamber 19 and/or for cleaning the shaving apparatus 1, and/or for maintenance reasons, e.g. for changing the internal cutting member 16*a*, 16*b*, housing 9 may be opened, in that the external cutting member 14*a*, 14*b* including the upper portion of housing 9 which also comprises the skin supporting surface 18*a*, 18*b* can be tilted in an open position about a hinge H, shown in FIG. 2 on the right hand side. This in general is known and will not be described in greater detail below.

For each cutting unit 10*a*, 10*b*, the shaving unit 8 comprises a cutting unit input spindle 22*a*, 22*b* which engages said internal cutting member 16*a*, 16*b* for driving it. The cutting unit input spindle 22*a*, 22*b* is driven via the gear box 12 by a main input spindle 28 which in turn in use is connected with the drive system 6. The main input spindle 28 is rotatable about a main axis AM and drives all cutting unit input spindles 22*a*, 22*b* of the shaving unit 8.

The shaving unit 8 further comprises an adjustment system 11*a*, 11*b* for each cutting unit 10*a*, 10*b* which is configured to adjust at least one operational parameter of the shaving unit 8. The adjustment system 11*a*, 11*b* comprises an adjustment input drive member 13*a*, 13*b* which is arranged to be rotational about an adjustment member axis D1, D2 and drivable by the main input spindle 28. In the embodiment shown in the attached drawings, the adjustment member axis D1, D2 coincides with the cutting member axis A1, A2. This is beneficial, as it results in a simple construction and a compact design.

Figure 3:
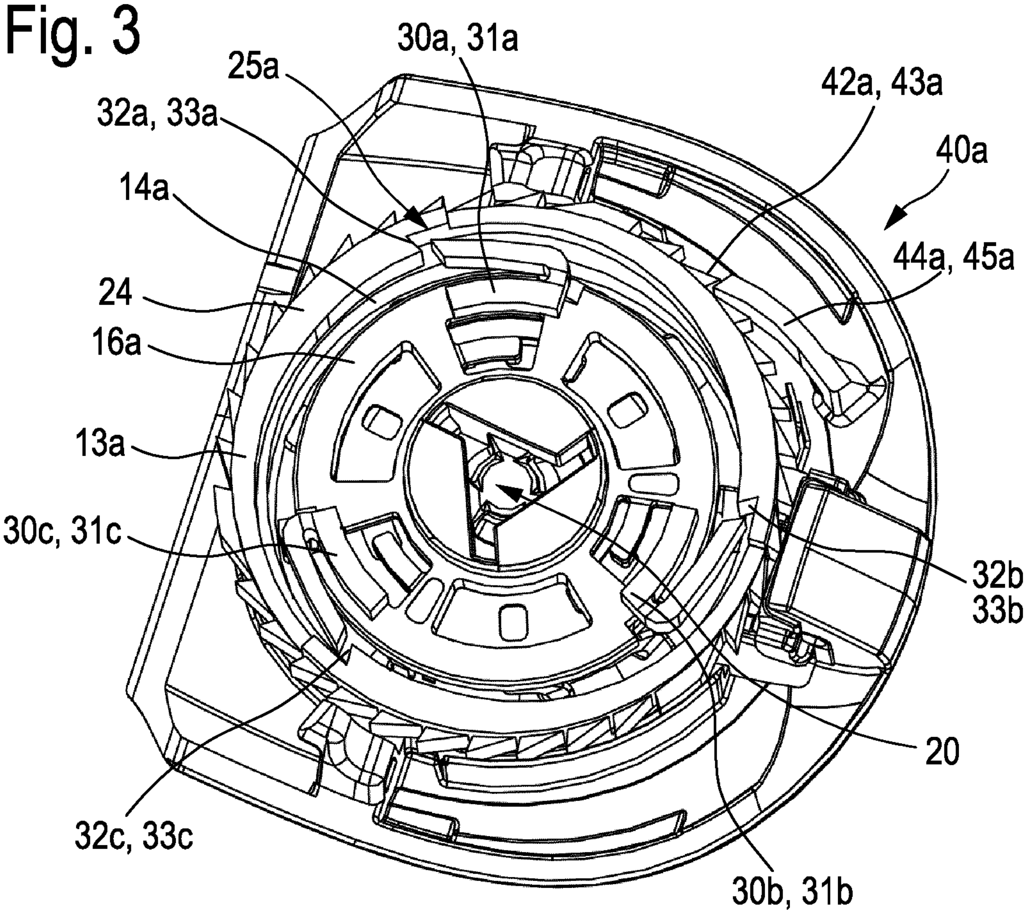
FIG. 3 shows a perspective view of a cutting unit with a portion of the housing and without external cutting member.

For coupling the adjustment input drive member 13*a*, 13*b* with the main input spindle 28, a unidirectional rotational coupling member 25*a*, 25*b* is arranged to provide a coupled condition of the main input spindle 28 relative to the adjustment input drive member 13*a*, 13*b*. This can be seen for a first embodiment with respect to the drawings FIG. 3 to FIG. 7B. FIG. 3 shows a view from below of the right-hand cutting unit 10*b* of FIG. 2 with the lower portion of housing 9 left away. Thus, the internal cutting member 16 can be seen from below with a central receiving portion 20 which receives a top portion of the cutting unit input spindle 22*a*, 22*b*. A rotation of the internal cutting member 16*a*, 16*b* with respect to FIG. 3 into a main direction, which is the second direction, would be a clockwise rotation. According to this particular preferred embodiment, a first portion of the unidirectional rotational coupling member 25*a*, 25*b* is attached to the internal cutting member 16*a*, 16*b*. In the embodiment shown in FIG. 3, this first portion comprises first clutch member 30*a*, 30*b*, 30*c* attached to the internal cutting member 16*a*, 16*b*. Thus, the first portion of the unidirectional rotational coupling member 25*a*, 25*b* rotates together with the internal cutting member 16 and is also driven together with the internal cutting member 16*a*, 16*b*. Even though this is particularly preferred, as it may result in a compact design with reduced part count, also embodiments in which the first portion of the unidirectional rotational coupling member 25*a*, 25*b* is not attached to the internal cutting member 16*a*, 16*b*, but rather formed as a separate element, are contemplated.

The unidirectional rotational coupling member 25*a*, 25*b* further comprises a second portion which in this embodiment is provided on a ring member 24. The ring member 24 also is concentrically arranged about the cutting member axis A1, A2 and the adjustment member axis D1, D2 in this embodiment. The ring member 24 comprises second clutch member 32*a*, 32*b*, 32*c*, which mate with the first clutch member 30*a*, 30*b*, 30*c*. The unidirectional rotational coupling member 25*a*, 25*b* is formed such that a rotation of the first portion of the unidirectional coupling member into the main direction, which is the second direction, is allowed relative to the second portion of the unidirectional rotational coupling member, however, when the first portion of the unidirectional rotational coupling member 25*a*, 25*b* rotates into the first direction, which is the reverse direction, the first and second portions of the unidirectional rotational coupling member 25*a*, 25*b* engage with each other due to a coupling of the first and second clutch members 30*a*, 30*b*, 30*c*, 32*a*, 32*b*, 32*c* so that also the second portion of the unidirectional rotational coupling member is rotated into the first direction. According to the embodiment shown in FIG. 3, the first clutch member 30*a*, 30*b*, 30*c* is a flexible tongue 31*a*, 31*b*, 31*c* and the second clutch member 32*a*, 32*b*, 33*c* is a notch 33*a*, 33*b*, 33*c* which is formed in the ring member 24. As can be inferred from FIG. 3 and also from FIG. 4, the tongues 31*a*, 31*b*, 31*c* protrude into the counter-clockwise direction such that when the first portion of the unidirectional rotational coupling member 25*a*, 25*b* together with the internal cutting member 16*a*, 16*b* is rotated into a counter-clockwise direction, the flexible tongues 31*a*, 31*b*, 31*c* engage with the respective notches 33*a*, 33*b*, 33*c* and build a form-locking connection with the ring member 24.

In this particular embodiment, ring member 24 is made out of a plastic material and is attached to the external cutting member 14*a*, 14*b*. This can best be seen in FIG. 5 in an exploded view. The embodiment shown in FIGS. 3 to 9 is particularly adapted to adjust the minimum value e of the exposure distance ed (see also FIG. 2). The exposure distance ed is the axial height of the upper surface of the external cutting member 14*a*, 14*b* with respect to the housing 9, in particular with respect to the skin supporting surface 18*a*, 18*b*. To adjust this exposure distance and in particular the minimum value e, the adjustment input drive member 13*a*, 13*b* is provided with an exposure setting member 35. The exposure setting member 35 is adapted and arranged to translate a rotation of the adjustment input drive member 13*a*, 13*b* into an axial positioning and movement of the external cutting member 14*a*, 14*b*. In the shown embodiment, in particular in FIGS. 5, 6 and 7, it can be seen that the exposure setting member 35 comprises first, second and third ramps 36*a*, 36*b*, 36*c* running on a respective support structure 37 formed in said housing 9 (see FIGS. 7A, 7B). Dependent on the angular position of the ring member 24 and thus dependent on the angular position of the external cutting member 14*a*, 14*b*, the minimum value e for the exposure distance can be set as illustrated in FIGS. 7A, 7B. From these figures, FIG. 7A illustrates that the support 37 is approximately in the middle of the ramp 36*a* and therefore an intermediate minimum exposure is set. In FIG. 7B, the adjustment input drive member 13*a*, 13*b* is rotated further closely to a maximum value of the maximum settable exposure (FIG. 7B), as the support 37 is rather at the end of the ramp 36*a*. If the adjustment input drive member 13*a*, 13*b* and therefore in this embodiment the external cutting member 14*a*, 14*b* is rotated further, the adjustment input drive member 13*a*, 13*b* will fall down again as the support 37 is moved to the left side of the end shoulder 36*d* of the ramp 36*a*.

Figure 4:
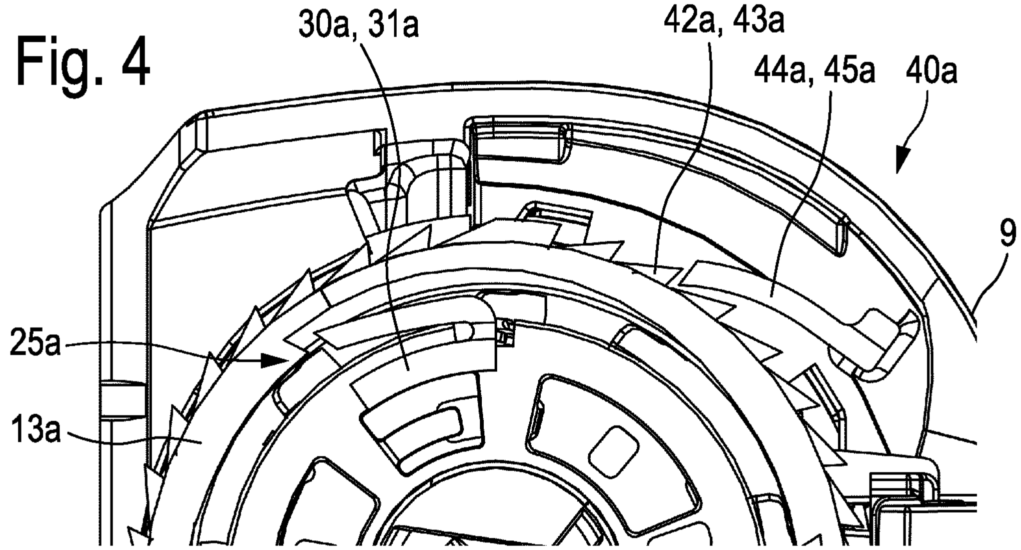
FIG. 4 shows a large view of FIG. 3.
Figure 5:
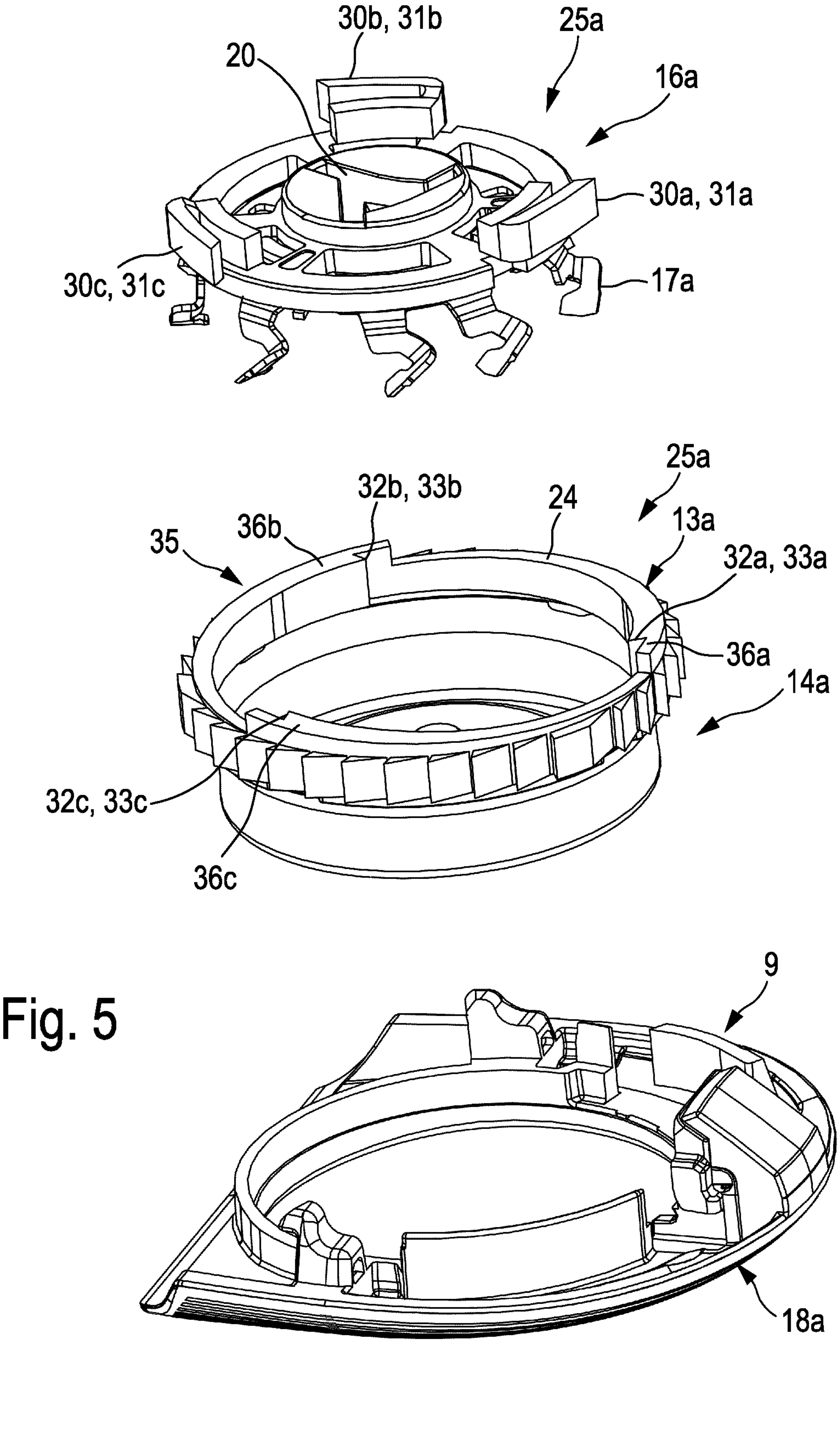
FIG. 5 shows an exploded view of a top portion of the housing, an external cutting member and an internal cutting member.

Since in the present embodiment, the adjustment input drive member 13*a*, 13*b* is fixedly attached to the external cutting member 14*a*, 14*b*, the external cutting member 14*a*, 14*b* will rotate when the adjustment input drive member 13*a*, 13*b* is rotated. Since for this reason the external cutting member 14*a*, 14*b* in principle is rotatable, the present embodiment incorporates a further unidirectional rotational coupling member 40*a*, 40*b* which holds the external cutting member 14*a*, 14*b* fixed, when the main input spindle 28 is rotated in the second direction which is the main direction. Thus, the further unidirectional rotational coupling member 40*a*, 40*b* is arranged to prevent, during use, rotation of the adjustment input drive member 13*a*, 13*b* relative to the housing 9 in said second direction of the internal cutting member 16*a*, 16*b* about the cutting member axis A1, A2. Moreover, beside the effect that the external cutting member 14*a*, 14*b* is held in a fixed position, also the adjustment input drive member 13*a*, 13*b* is prevented from being rotated into the second direction which could cause a readjustment or further adjustment of the operational parameter which has been previously adjusted previously by rotating the adjustment input drive member 13*a*, 13*b* into the first direction (reverse direction). The further unidirectional rotational coupling member 40*a*, 40*b* comprises a first locking member 42*a*, 42*b* attached to the adjustment input drive member 13*a*, 13*b* and a second locking member 44*a*, 44*b* attached to the housing 9 for cooperation with the first locking member 42*a*, 42*b*. The further unidirectional rotational coupling member 40*a*, 40*b* may best be seen in FIGS. 3, 4 and 5. The first locking member 42*a*, 42*b* of the further unidirectional rotational coupling member 40*a*, 40*b* in the embodiment shown in FIGS. 3 and 4 is formed as first resting elements 43*a*, 43*b*, in the form of teeth. They provide a ratchet shape on an outer circumferential surface of the adjustment input drive member 13*a*, 13*b*, in particular formed on the outer circumferential surface of the ring member 24. Preferably, the first locking members 42*a*, 42*b* are integrally formed with the ring member 24 as also the second clutch members 32*a*, 32*b*, 32*c* are, so that one single part can be used and part count can be reduced.

The second locking member 44*a*, 44*b* in the shown embodiment is formed as a second resting element 45*a*, 45*b*, in particular in the form of a flexible tongue as can best be seen in FIG. 4. This second resting element 45*a*, 45*b* is attached directly to the housing 9 and in particular integrally formed with housing 9. As can be understood from FIG. 4, the cooperation of the first and the second resting elements 43*a*, 43*b*, 45*a*, 45*b* allows rotation of the adjustment input drive member 13*a*, 13*b* with respect to FIG. 4 in a counter-clockwise direction, while a rotation into a clockwise direction is inhibited. Thus, the shaving unit 8 according to the present embodiment includes in other word two one-way clutches, namely the unidirectional rotational coupling member 25*a*, 25*b* and the further unidirectional rotational coupling member 40*a*, 40*b* which each allow different elements to be rotated. Together, they form a mechanism which, when the main input spindle 28 is rotated into the first direction, allows the internal cutting member 16*a*, 16*b* and the external cutting member 14*a*, 14*b* to be rotated together into the reverse direction, while, when the main input spindle 28 is rotated into the second direction, the external cutting member 14*a*, 14*b* is held fixed while the internal cutting member 16*a*, 16*b* may rotate relative to the external cutting member 14*a*, 14*b* for carrying out the cutting operation.

In an embodiment, in which the shaving apparatus 1 comprises two or more cutting units 10*a*, 10*b*, one can imagine that the minimum value E of the exposure distance, which has been set by rotating the adjustment input drive member 13*a*, 13*b* into the first direction, may differ between the first and the second cutting units 10*a*, 10*b*. This could be caused by a manual movement of the adjustment input drive member, or a cleaning operation in which the adjustment input drive member 13*a*, 13*b* has been rotated by a user. The embodiment as shown herein in FIGS. 1 to 9 allows a simply synchronization of the two or more cutting units.

Again, making reference to FIGS. 3, 4, 6, 7A, 7B, it can be seen that the unidirectional rotational coupling member 25*a*, 25*b* includes three first clutch members 30*a*, 30*b*, 30*c* and three second clutch members 32*a*, 32*b*, 32*c*. Thus, in this particular embodiment the unidirectional rotational coupling member 25*a*, 25*b* is configured and arranged to rotationally couple the main input spindle 28 and the adjustment input drive member 13*a*, 13*b* at a predetermined number C1 of angular positions which are uniformly distributed about the cutting member axis A1, A2, wherein in this embodiment C1 equals 3. Each of the three first clutch members 30*a*, 30*b*, 30*c* and the second clutch members 32*a*, 32*b*, 32*c* are uniformly distributed about the cutting member axis A1, A2, namely each spaced 120°. Thus, when the main input spindle 28 is rotated into the reverse direction (first direction), the first portion of the unidirectional rotational coupling member 25*a*, 25*b*, which in this embodiment is attached to the internal cutting member 16*a*, 16*b*, needs to be rotated about 120° at most until it couples with the second portion of the unidirectional rotational coupling member 25*a*, 25*b* which is attached to the external cutting member 14*a*, 14*b*. Since also the ramps 36*a*, 36*b*, 36*c* are uniformly distributed in the same manner as the first and second clutch members 30*a*, 30*b*, 30*c*, 32*a*, 32*b*, 32*c* are, each of the at least two cutting units 10*a*, 10*b* are synchronized when each of the unidirectional rotational coupling members 25*a*, 25*b* in each of the cutting units 10*a*, 10*b* are in a coupled or engaged state.

This is illustrated in FIGS. 8A to 8D. In these schematic drawings, the ring illustrates the external cutting member 14*a*, 14*b* and the arrow in the middle illustrates the internal cutting member 16*a*, 16*b*. It should, however, be understood that in embodiments, in which the first portion of the unidirectional rotational coupling member 25*a*, 25*b* is not attached to the internal cutting member 16*a*, 16*b* and the second portion of the unidirectional rotational coupling member 25*a*, 25*b* is not attached to the external cutting member 14*a*, 14*b* and the adjustment input drive member 13*a*, 13*b* is not attached to either of the second portion of the unidirectional rotational coupling member 25*a*, 25*b* and the external cutting member 14*a*, 14*b*, the ring in FIGS. 8A to 8D may illustrate the adjustment input drive member 13*a*, 13*b* and the arrow in FIGS. 8A to 8D may illustrate the first portion of the unidirectional rotational coupling member 25*a*, 25*b*.

Figure 8A:
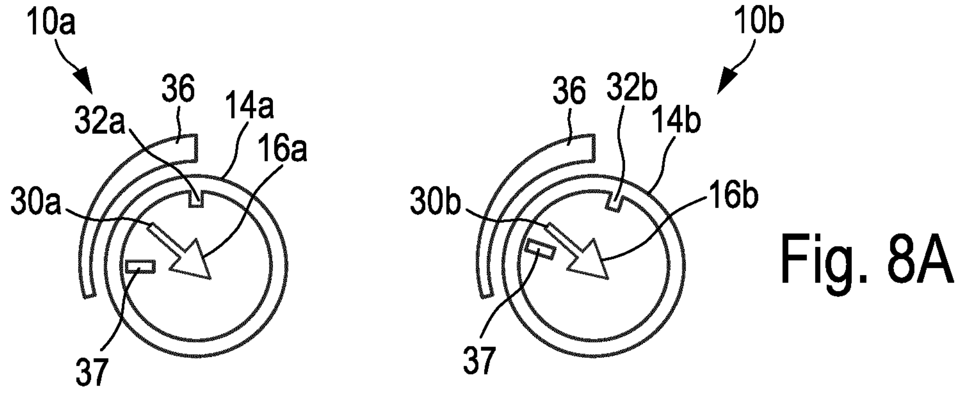
FIGS. 8A-8D show schematic illustrations for synchronizing two or more cutting units.
Figure 8B:
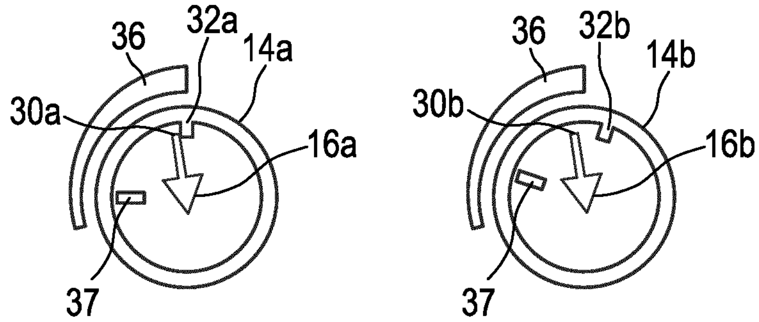
Figure 8C:
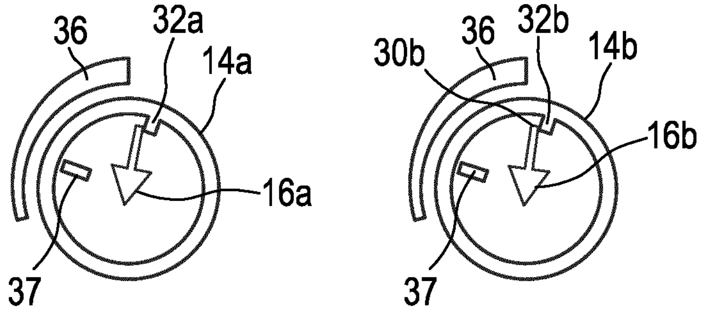
Figure 8D:
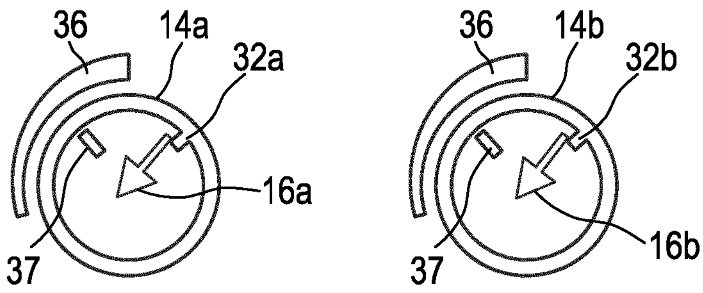

Now turning to the FIGS. 8A to 8D in detail, the upper left element illustrates the ramp 36 which is indicated by its increasing width in a clockwise direction. Element 37 indicates the support and thus the respective current value of the exposure distance. Element 32*a*, 32*b* indicates a second clutch member and element 30*a*, 30*b*, which is the end portion of the arrow, indicates a first clutch member. As can be seen in FIG. 8A, the external cutting member 14*a* of the left cutting unit 10*a* is rotated so that the second clutch member 32*a* is approximately in a twelve o'clock position, while the external cutting member 14*b* of the right-hand cutting unit 10*b* is rotated such that the second clutch member 32*b* is approximately in a one o'clock position. Accordingly, the exposure distance ed is different between the cutting units 10*a*, 10*b*. Now, for synchronizing the cutting units 10*a*, 10*b*, the main input spindle 28 is rotated in the first direction, which is the reverse direction, which in turn results in the internal cutting member 16*a*, 16*b* rotating in the first direction. This is shown in FIGS. 8B, 8C, 8D. When the internal cutting members 16*a*, 16*b* are rotated, the first clutch member 30*a* of the left cutting unit 10*a* will come in contact with the second coupling member 32*a* of the left cutting unit as shown in the left portion of FIG. 8B. On the right portion of FIG. 8B, the first and second clutch members 30*b*, 32*b* are still not engaged, as the external cutting member 14*b* has previously been rotated further. When now the main input spindle 28 rotates further, the external cutting member 14*a* of the left cutting unit 10*a* is pushed into rotation such that the second clutch member 32*a* of the left cutting unit 10*a* also comes to a one o'clock position as shown in FIG. 8C. In this position, also the first clutch member 30*b* of the right-hand cutting unit 10*b* comes into contact with the second clutch member 32*b* of the right cutting unit 10*b*. Thus, when the internal cutting members 16*a*, 16*b* are rotated further (see FIG. 8D), they push the external cutting member 14*a*, 14*b* further in rotation and synchronization of the cutting units 10*a*, 10*b* is accomplished. As can be understood also with reference to FIGS. 3 to 5, when there are three second clutch members 32*a*, 32*b*, 32*c* uniformly distributed about the axis A1, A2 and accordingly three ramps 36, it is always sufficient to rotate the internal cutting member 16*a*, 16*b* about a range of 120° to synchronize all cutting units 10*a*, 10*b*.

It is preferred that after every startup of the shaving apparatus 1, a step of synchronizing the cutting units 10*a*, 10*b* is carried out and therefore it is preferred that after switching on the shaving apparatus 1, the main input spindle 28 is rotated in the first direction which is the reverse direction, about a predetermined angular range, dependent on the specific design of the adjustment system 11*a*, 11*b*.

Figure 9:
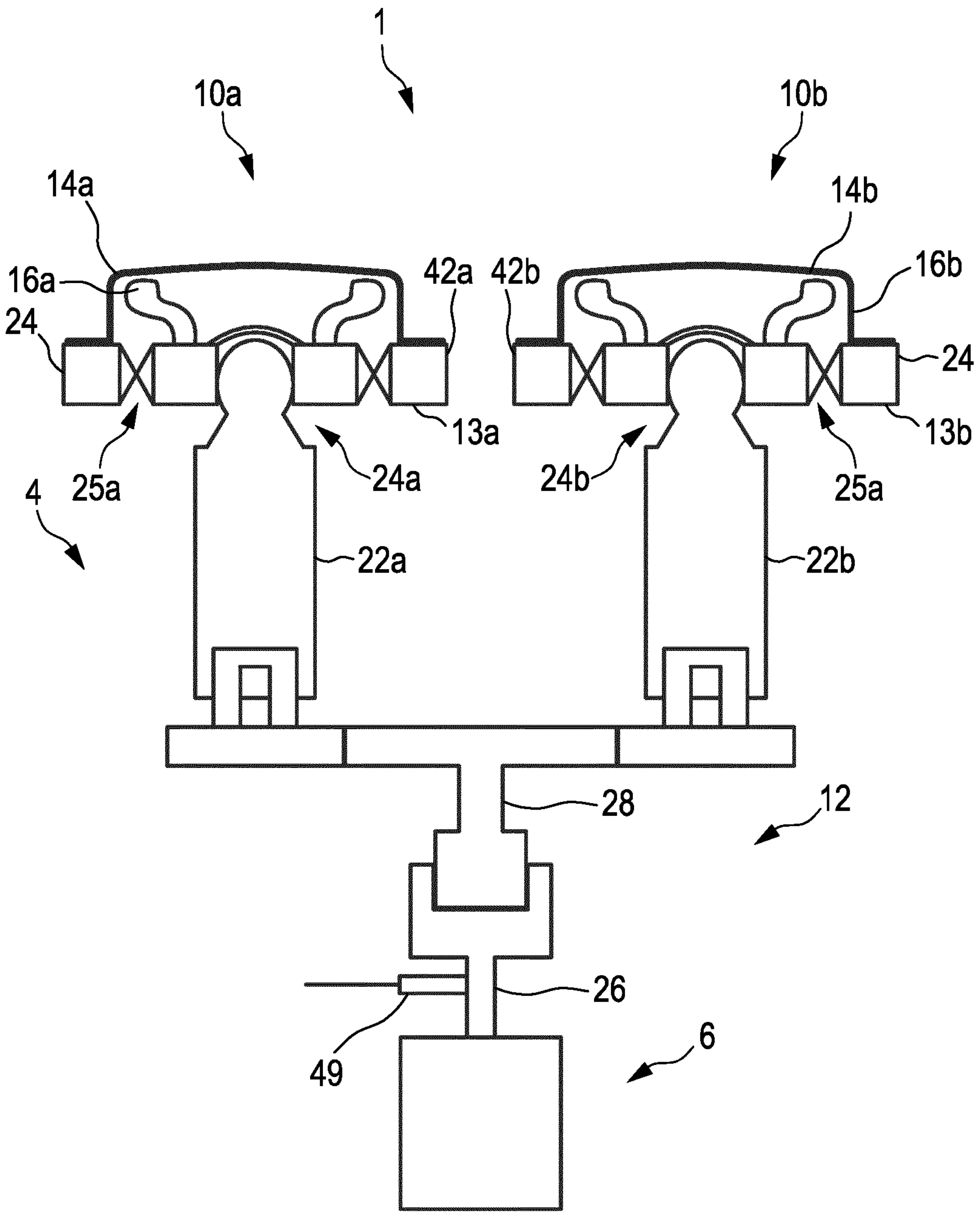
FIG. 9 shows a schematic cut view of the shaving unit.
Figure 10:
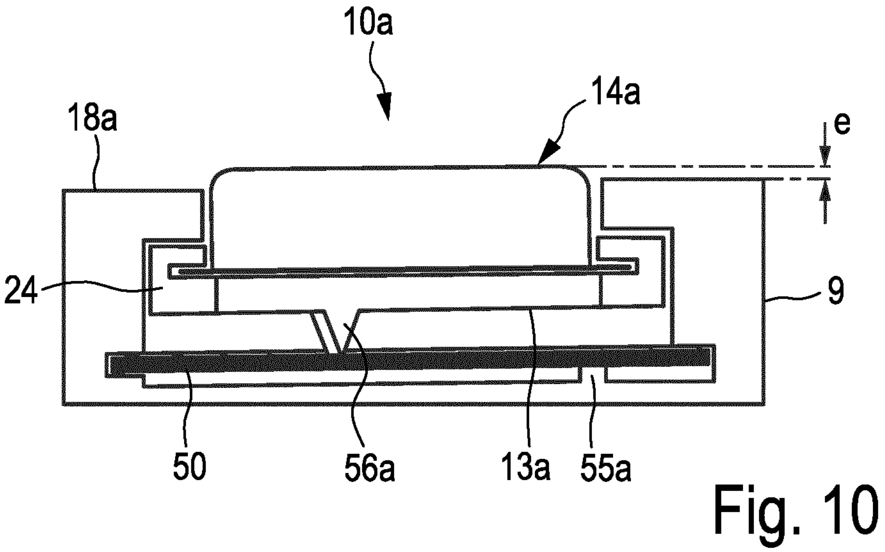
FIG. 10 shows a schematic cut view of a cutting unit in a further embodiment.
Figure 11A:
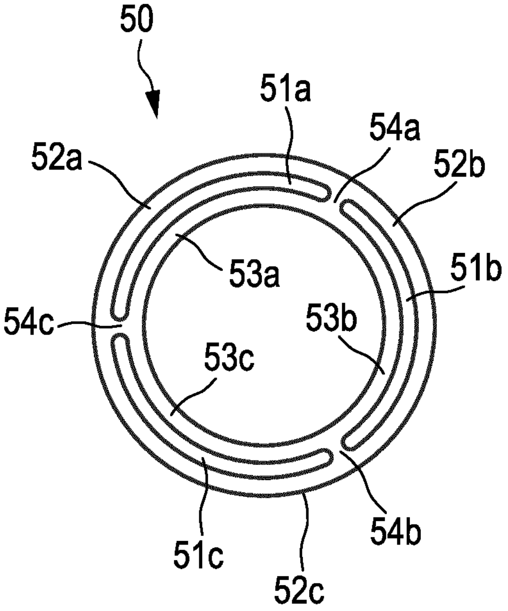
FIG. 11A shows a blade spring of FIG. 10.
Figure 11B:
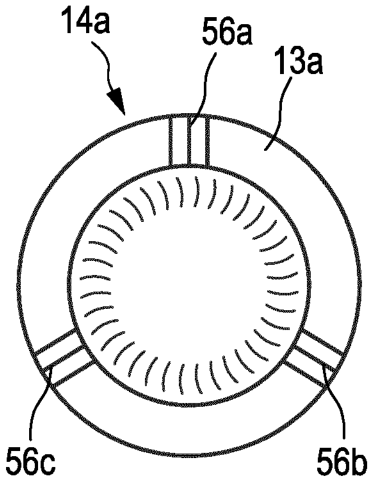
FIG. 11B shows an adjustment input drive member of FIG. 10, FIGS. 12A-13B show two different embodiments of adjusting a stiffness of the blade spring.
Figure 12A:
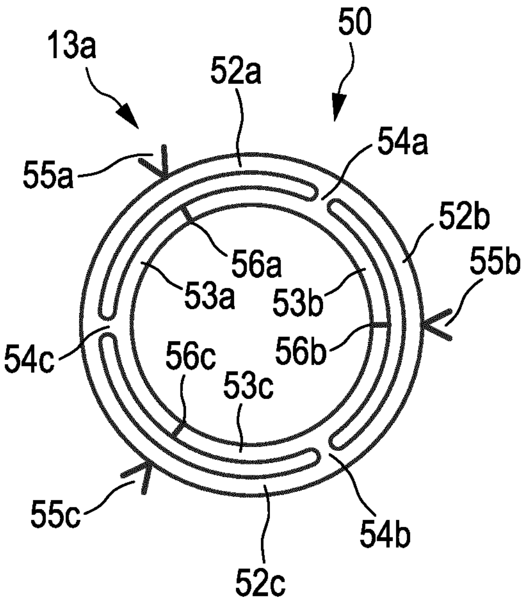
Figure 12B:
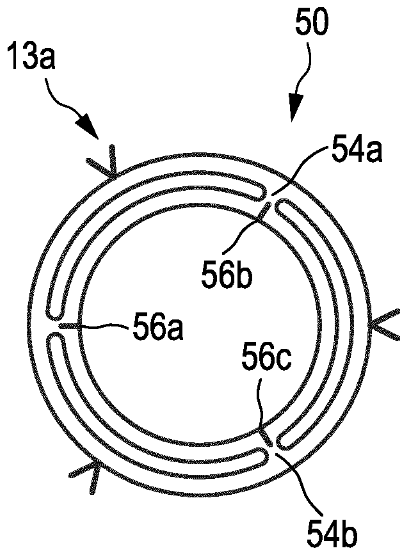

FIG. 9 now illustrates a schematic view of the shaving apparatus 1, in particular with respect to the drive system 6. The drive system 6 comprises an output shaft 26 which can be coupled with the main input spindle 28. Preferably, the main input spindle 28 and the output shaft 26 are coupleable in three different rotational positions, each shifted about 120° from the other. In FIG. 9 moreover, a drive sensor 49 is shown which measures rotation of the output shaft 26. Since the output shaft 26 is coupled with the main input spindle 28, which in turn is coupled via gear box 12 to the adjustment input drive members 13*a*, 13*b*, it is possible to obtain information regarding the adjustable operational parameter based on the rotational position of the output shaft 26. Therefore, it is not essential that the drive sensor 49 measures rotation of the output shaft 26 into the second direction which is the main direction, but rather it is sufficient that the drive sensor 49 only measures rotation of the output shaft 26 into the first direction which is the reverse direction. Based on the rotation of the output shaft 26, a controller may determine the rotational position of the adjustment input drive member 13*a*, 13*b* and therefore a value of an adjusted operational parameter.

FIGS. 10 to 16 now illustrate further embodiments for adjusting operational parameters of the shaving unit 8. First of all, FIGS. 10 to 13B make reference to a blade spring 50 which is provided in each cutting unit 10*a*, 10*b* for biasing the external cutting member 14*a*, 14*b* into an extended position. The external cutting member 14*a*, 14*b* (see FIG. 10) is thus seated on the blade spring 50 inside the housing 9 and biased into the extended position, thus into an upper direction with respect to FIG. 10. The blade spring 50 is used to increase comfort for the user, as the external cutting member 14*a*, 14*b* may be slightly pushed into the housing 9 and thus the exposure distance can be reduced. The blade spring 50 in general is ring-shaped (see FIG. 11A) and comprises three slots 51*a*, 51*b*, 51*c*, so that three outer portions 52*a*, 52*b*, 52*c* and inner portions 53*a*, 53*b*, 53*c* are formed. These portions are separated by solid portions 54*a*, 54*b*, 54*c*.

The housing 9 comprises three spring supports 55*a*, 55*b*, 55*c* on which the blade spring 50 is supported. The blade spring 50 is rotationally fixed inside the housing 9. In a similar manner, also the adjustment input drive member 13*a*, 13*b* comprises three spring supports 56*a*, 56*b*, 56*c* for supporting the adjustment input drive member 13*a*, 13*b* on the blade spring 50. Also, in this embodiment, the adjustment input drive member 13*a*, 13*b* is fixedly attached to the external cutting member 14*a*, 14*b*. Again, the adjustment input drive member 13*a*, 13*b* may include a ring member 24 as basically described beforehand.

The blade spring 50 is placed in such a manner in the housing 9 that the spring supports 55*a*, 55*b*, 55*c* of the housing 9 contact the outer arms 52*a*, 52*b*, 52*c*, and the spring supports 56*a*, 56*b*, 56*c* of the adjustment input drive member 13*a*, 13*b* contact the inner arms 53*a*, 53*b*, 53*c*. Thus, the blade spring 50 is double acting, meaning that on the one hand the specific placement of the spring support 55*a*, 55*b*, 55*c* on the outer portions 52*a*, 52*b*, 52*c* is relevant, as well as the rotational placement of the spring support 56*a*, 56*b*, 56*c* of the adjustment input drive member 13*a*, 13*b*, 13*c* on the inner portions 53*a*, 53*b*, 53*c*.

Figure 13A:
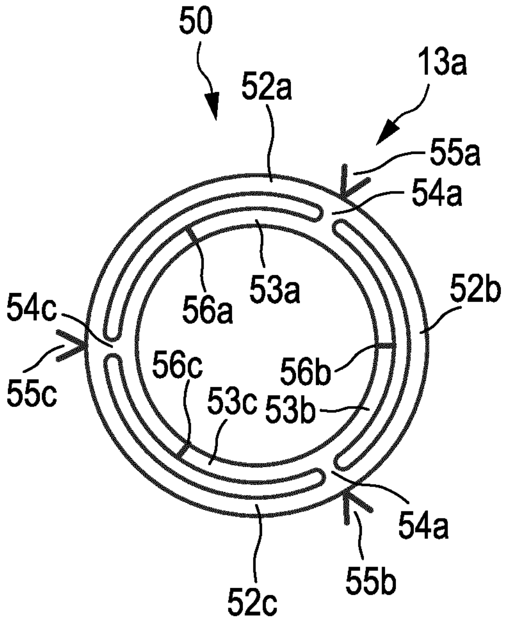
Figure 13B:
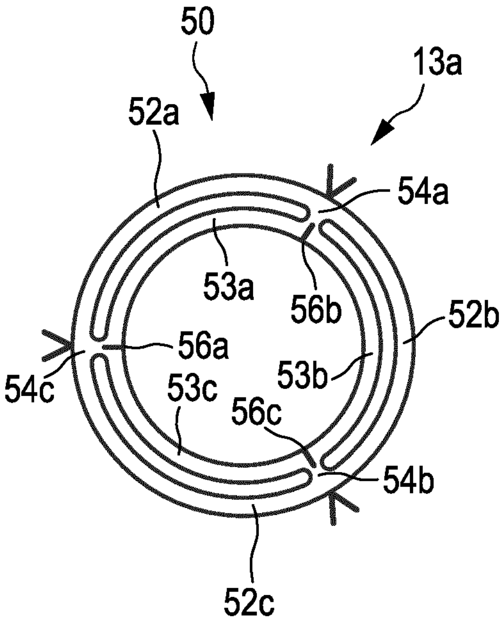

Now turning to FIGS. 12A to 13B, this functionality is illustrated. With respect to FIG. 12A, the blade spring 50 is placed in such a manner that the spring supports 55*a*, 55*b*, 55*c* of the housing 9 are substantially placed in the middle between two rigid portions 54*a*, 54*b*, 54*c* on the outer portions 52*a*, 52*b*, 52*c* which result in a low tensioning or stiffness. At the same time, in the arrangement shown in FIG. 12A, also the spring supports 56*a*, 56*b*, 56*c* of the adjustment input drive member 13*a*, 13*b* are placed in the middle of the inner portions 53*a*, 53*b*, 53*c*, again resulting in a very low stiffness. The position shown in FIG. 12A would result in the maximum of comfort and softness. When now the adjustment input drive member 13*a*, 13*b* is rotated due to a rotation of the main input spindle 28 into the first direction, the placement of the spring supports 56*a*, 56*b*, 56*c* with respect to the blade spring 50 is changed. With respect to FIGS. 12A, 12B, the spring supports 56*a*, 56*b*, 56*c* would rotate to a counter-clockwise direction to any position on the blade spring 50; in FIG. 12B it is illustrated that the spring supports 56*a*, 56*b*, 56*c* are substantially in the regions of the solid portions 54*a*, 54*b*, 54*c*. This results in a higher stiffness, as basically only the outer portions 52*a*, 52*b*, 52*c* of the blade spring 50 are acting and the inner portions 53*a*, 53*b*, 53*c* are without function in this position. Thus, the overall stiffness of the blade spring 50 can be changed between a very low stiffness (FIG. 12A) and a middle hard/high stiffness (FIG. 12B). This range can also be adapted by rotating the blade spring 50 with respect to the housing 9. This is illustrated in FIGS. 13A to 13B. In FIGS. 13A and 13B, the blade spring 50 is rotated such that the spring supports 55*a*, 55*b*, 55*c* of the housing 9 are in the regions of the solid portions 54*a*, 54*b*, 54*c*. Thus, in the position as shown in FIG. 13A, in which the spring supports 56*a*, 56*b*, 56*c* of the adjustment input drive member 13*a*, 13*b* are in a middle position of the inner portions 53*a* 53*b*, 53*c*, the stiffness is set to a middle value, as the outer portions 52*a*, 52*b*, 52*c* are basically without function. When now the main input spindle 28 is rotated in the reverse direction (first direction), the position of the spring supports 56*a*, 56*b*, 56*c* can be changed and as shown in FIG. 13B is changed such that they are positioned substantially in the region of the solid portions 54*a*, 54*b*, 54*c*, thus resulting in a very high stiffness.

It should be understood that the position of the spring supports 55*a*-55*c*, 56*a*-56*c* is not limited to the shown positions in FIGS. 12A to 13B, but rather could be any rotational position with respect to the blade spring 50.

FIGS. 14 to 15C show a still further embodiment. In this embodiment, the external cutting member 14*a*, 14*b* is received in a hinge body 62 which provides a tilting hinge 60 allowing tilting of said external cutting member 14*a*, 14*b* relative to the skin supporting surface 18*a*, 18*b* about a tilting axis T. The hinge body 62 is again integrally formed with the adjustment input drive member 13*a*, 13*b*. In this embodiment, the adjustment input drive member 13*a*, 13*b* includes, as shown in FIG. 15A, first and second hinge elements 64*a*, 64*b*, and the housing 9 comprises third and fourth hinge elements 65*a*, 65*b* (see FIGS. 15B and 15C). The third and fourth hinge elements 65*a*, 65*b* are fixed in their position and the first and the second hinge elements 64*a*, 64*b* are attached to the rotatable adjustment input drive member 13*a*, 13*b*. When all hinge elements 64*a*, 64*b*, 65*a*, 65*b* are oriented with their respective axis parallel to each other as shown in FIG. 15C, tilting about tilting axis T is allowed. When, however, the adjustment input drive member 13*a*, 13*b* is rotated by 90°, tilting is prevented. Thus, by rotating the main input spindle 28 in the first direction (reverse direction), the tilting functionality in this embodiment may be switched on and off, respectively.

Figure 16:
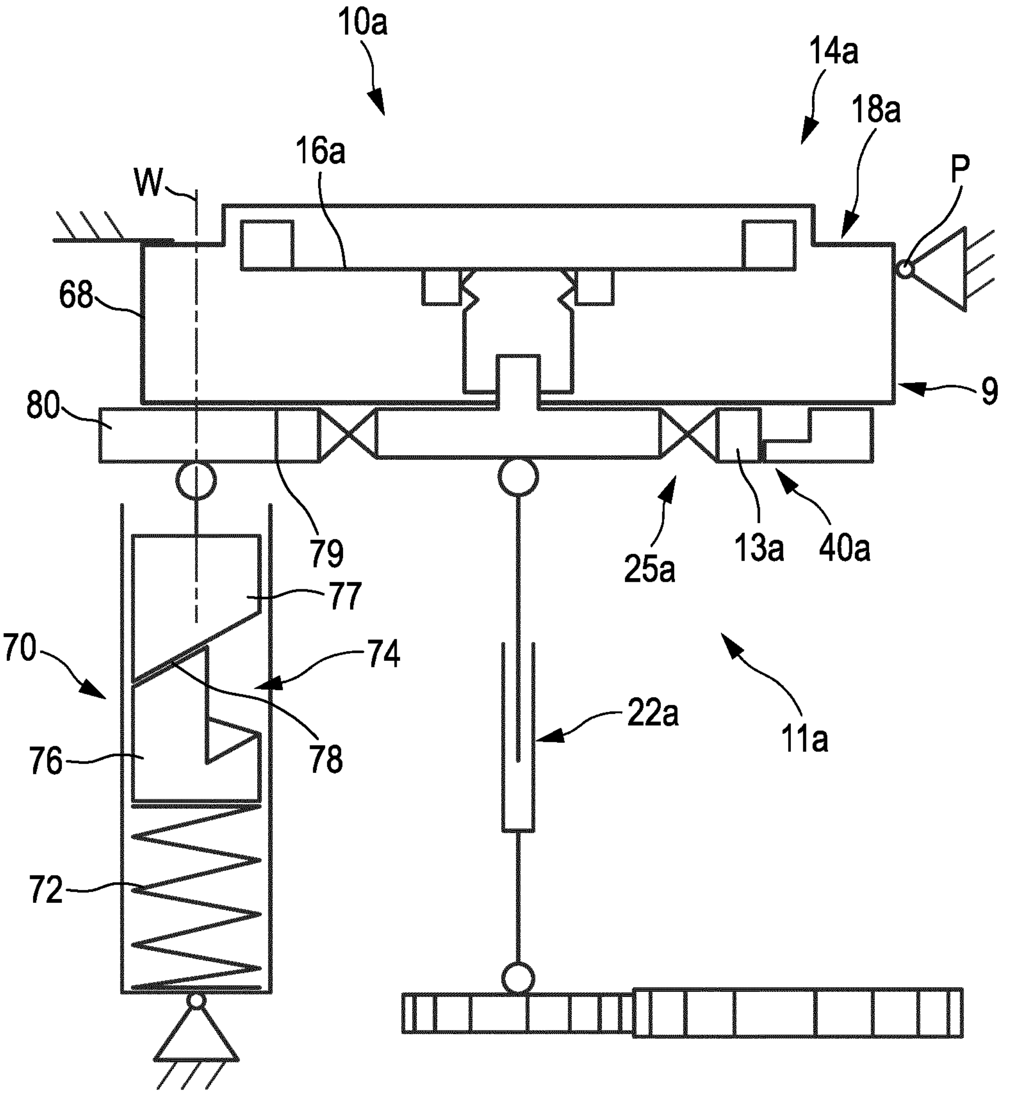
FIG. 16 shows a schematic cut view through a cutting unit.

An even further embodiment is illustrated in FIG. 16, which shows in a rather schematic way that a portion of the housing 9, namely a supporting member 68 which includes a hair chamber and which is suspended and thus pivotable about a pivot axis P. Pivot axis P in FIG. 16 is perpendicular to the plane of the drawing and thus is only illustrated by a dot. For suspending the supporting member 68, a suspension assembly 70 is provided. The suspension assembly 70 comprises a spring element 72 in the form of a coiled spring and a tensioning mechanism 74. The supporting member 68 is shown in a pivotal rest position. It may, however, be pivoted downwards with respect to FIG. 16 to be moved out of the pivotal rest position. The spring element 72 biases the supporting member 68 into the pivotal rest position. The tensioning mechanism 74 as shown in FIG. 16 comprises a spring holder 76 and a wedge element 77. The spring holder 76 also comprises a wedge-shaped surface 78. By rotating the wedge element 77 about a wedge axis W, the wedge element 77 and the wedge-shaped surface 78 can be moved relative to each other and the spring holder 76 can be pushed further down to compress the spring element 72 or can move upwards to at least partially relax the spring element 72 dependent on the direction of rotation. Thus, the tension of the suspension assembly 70 is adjustable by such an assembly. The adjustment system 11*a*, 11*b* in this embodiment is now used to rotate the wedge element 77 accordingly. The adjustment input drive member 13*a*, 13*b* is attached to the cutting unit input spindle 22*a*, 22*b* and not to the internal cutting member 16*a*, 16*b* or the external cutting member 14*a*, 14*b* as compared to the embodiments described beforehand. However, again, between the cutting unit input spindle 22*a*, 22*b* and the adjustment input drive member 13*a*, 13*b*, the unidirectional rotational coupling member 25*a*, 25*b* is arranged. Thus, when the cutting unit input spindle 22*a*, 22*b* is rotated in the first direction, the unidirectional rotational coupling member 25*a*, 25*b* couples the adjustment input drive member 13*a*, 13*b* with the cutting unit input spindle 22*a*, 22*b* and decouples them when the cutting unit input spindle 22*a*, 22*b* is rotated into the second direction.

The adjustment input drive member 13*a*, 13*b* in this embodiment is provided with a gear 79 at the circumferential outer surface which acts together with a gear wheel 80 of the suspension assembly. Thus, when the adjustment input drive member 13*a*, 13*b* is rotated, also the gear wheel 80 is rotated and in turn rotates the wedge element 77 which pushes down or relaxes the spring holder 76. For keeping the adjustment input drive member 13*a*, 13*b* in its adjusted position, also the further unidirectional coupling member 40*a*, 40*b* is provided as basically described before.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

The invention claimed is:

1. A shaving unit for a shaving apparatus, the shaving unit comprising:

a housing;

at least one cutting unit accommodated and supported by the housing and comprising an external cutting member having a plurality of hair-entry openings and an internal cutting member which is rotatable relative to the external cutting member about a cutting member axis;

a main input spindle which is rotatable about a main axis and which is coupled to each of the at least one cutting unit to rotationally drive the internal cutting member thereof; and an adjustment system configured to adjust at least one operational parameter of the shaving unit, wherein the adjustment system comprises:

an adjustment input drive member arranged to be rotational about an adjustment member axis and drivable by the main input spindle;

a unidirectional rotational coupling member arranged to provide a coupled condition of the main input spindle relative to the adjustment input drive member, when the main input spindle rotates in a first direction about the main axis, such that the adjustment input drive member is driven by the main input spindle, wherein the unidirectional rotational coupling member is arranged to further provide a decoupled condition of the main input spindle relative to the adjustment input drive member, when the main input spindle rotates in a second direction about the main axis opposite to the first direction, such that the main input spindle is prevented from driving the adjustment input drive member.

2. The shaving unit as claimed in claim 1, wherein the adjustment member axis coincides with the cutting member axis, and wherein the unidirectional rotational coupling member comprises a first portion rotationally coupled to the internal cutting member and a second portion rotationally coupled to the adjustment input drive member.

3. The shaving unit as claimed in claim 2, wherein the second portion of the unidirectional rotational coupling member is rotationally coupled to the external cutting member.

4. The shaving unit as claimed in claim 3, wherein the adjustment input drive member is driven in a first rotational direction by the main input spindle, and wherein the external cutting member is coupled to the housing via an additional unidirectional rotational coupling member arranged to prevent, during use, rotation of the adjustment input drive member relative to the housing in a second rotational direction, opposite the first rotational direction, of the internal cutting member about the cutting member axis, said additional unidirectional rotational coupling member comprising a first locking member attached to the adjustment input drive member and a second locking member attached to the housing for cooperation with the first locking member.

5. The shaving unit according to claim 4, wherein the first locking member comprises a number (N1) of first arresting elements which are concentrically arranged relative to the cutting member axis with a uniform distribution about the cutting member axis, and in that the second locking member comprises a number (N2) of second arresting elements, wherein:

$$N1 \geq 8 \text{ and } 1 \leq N2 \leq N1;$$

the second arresting elements are configured and arranged to be each engageable with a respective one of the first arresting elements in any angular position of the adjustment input drive member about an axis of rotation relative to the housing; and each of the second arresting elements is configured and arranged to prevent rotation of the adjustment input drive member relative to the housing in the second rotational direction by engagement with said respective one of the first arresting elements in any angular position of the adjustment input drive member.

6. The shaving unit according to claim 5, wherein said unidirectional rotational coupling member is configured and arranged to rotationally couple said main input spindle and said adjustment input drive member at a predetermined number (C1) of angular positions uniformly distributed about the cutting member axis for rotating said adjustment input drive member into said first direction, with $1 \leq C1 \leq 10$, and wherein a number (N3) of selectable settings of said at least one operational parameter of the shaving unit equals N1/C1.

7. The shaving unit according to claim 2, wherein said the first portion of the unidirectional rotational coupling member comprises a first clutch member attached to the internal cutting member, and the second portion of the unidirectional rotational coupling member comprises a second clutch member attached to the adjustment input drive member for cooperation with the first clutch member.

8. The shaving unit according to claim 7, wherein said first clutch member is a flexible tongue and said second clutch member is a notch.

9. The shaving unit according to claim 2, wherein said unidirectional rotational coupling member is configured and arranged to rotationally couple said main input spindle and said adjustment input drive member at a predetermined number (C1) of angular positions uniformly distributed about the cutting member axis for rotating said adjustment input drive member into said first direction, with $1 \leq C1 \leq 10$.

10. The shaving unit according to claim 9, further comprising a cutting unit input spindle for the at least one cutting unit connected to and driven by said main input spindle, wherein said cutting unit input spindle is configured and arranged to be engaged with said internal cutting member in rotational positions of said cutting unit input spindle relative to said internal cutting member.

11. The shaving unit according to claim 9, further comprising a spindle gear box having a gear ratio of 1 or 1/C1.

12. The shaving unit according to claim 9, wherein C1=3.

13. The shaving unit according to claim 1, wherein said at least one cutting unit further comprises a respective skin supporting surface surrounding the external cutting member, wherein said external cutting member protrudes relative to the skin supporting surface in an axial direction parallel to the cutting member axis over an exposure distance, and wherein a minimum value of said exposure distance is dependent on an angular position of the adjustment input drive member about the cutting member axis relative to the housing;

wherein said main input spindle is rotatable in said first direction for changing said minimum value of said exposure distance.

14. The shaving unit according to claim 1, wherein the each at least one cutting unit comprises a blade spring for biasing said external cutting member into an extended position, wherein a stiffness of the blade spring is dependent on an angular position of said adjustment input drive member.

15. The shaving unit according to claim 1, wherein said at least one cutting unit further comprises a respective skin supporting surface surrounding the external cutting member, and a tilting hinge allowing tilting of said external cutting member relative to said skin supporting surface about a tilting axis, wherein in a first rotational position of said adjustment input drive member tilting is allowed and in a second rotational position of said adjustment input drive member tilting is prevented.

16. The shaving unit according to claim 1, wherein the at least one cutting unit further comprises a supporting member supporting the external cutting member, said supporting member being pivotable relative to the housing of the shaving unit, and wherein the at least one cutting unit further comprises a pretension suspension assembly for biasing the supporting member relative to the housing into a pivotal rest position, said pretension suspension assembly comprising a spring element and a tensioning mechanism for tensioning said spring element coupled with said adjustment input drive member, wherein rotation of said adjustment input drive member causes said tensioning mechanism to adjust tension of said spring element and, thereby, to adjust a biasing force exerted by said spring element on the supporting member in said pivotal rest position of the supporting member.

17. A shaving apparatus comprising a main body accommodating a drive system and the shaving unit according to claim 1, wherein said drive system includes a drive sensor for measuring a rotational position of an output shaft of said drive system.

18. A method for synchronizing two or more cutting units of a shaving unit, wherein the shaving unit comprises:

a housing;

at least one cutting unit accommodated and supported by the housing and comprising an external cutting member having a plurality of hair-entry openings and an internal cutting member which is rotatable relative to the external cutting member about a cutting member axis;

a main input spindle which is rotatable about a main axis and which is coupled to each of the at least one cutting unit to rotationally drive the internal cutting member thereof; and an adjustment system configured to adjust at least one operational parameter of the shaving unit, wherein the adjustment system comprises:

an adjustment input drive member arranged to be rotational about an adjustment member axis and drivable by the main input spindle;

a unidirectional rotational coupling member arranged to provide a coupled condition of the main input spindle relative to the adjustment input drive member, when the main input spindle rotates in a first direction about the main axis, such that the adjustment input drive member is driven by the main input spindle, wherein the unidirectional rotational coupling member is arranged to further provide a decoupled condition of the main input spindle relative to the adjustment input drive member, when the main input spindle rotates in a second direction about the main axis opposite to the first direction, such that the main input spindle is prevented from driving the adjustment input drive member; and wherein the method comprises the step of:

rotating said main input spindle in said first direction for a predetermined angular value.

19. The method according to claim 18, further comprising the step of:

rotating said main input spindle in said first direction at least until said unidirectional rotational coupling member causes engagement between said internal cutting member and said adjustment input drive member.

20. The method according to claim 18, wherein the adjustment member axis coincides with the cutting member axis, and wherein the unidirectional rotational coupling member comprises a first portion rotationally coupled to the internal cutting member and a second portion rotationally coupled to the adjustment input drive member, and wherein said unidirectional rotational coupling member is configured and arranged to rotationally couple the main input spindle and the adjustment input drive member at a predetermined number (C1) of angular positions uniformly distributed about the cutting member axis for rotating the adjustment input drive member into the first direction, with $1 \leq C1 \leq 10$; and wherein the method is for synchronizing two or more cutting units of the shaving unit, and the method further comprises the step of:

rotating said main input spindle in said first direction at least for a rotational angle of (360°/C1) degrees.

* * * * *